United States Patent [19]

Loftus

[11] 4,021,925
[45] May 10, 1977

[54] APPARATUS FOR AND PROCESS OF DETERMINING THE INTERNAL DIAMETER OF PIPELINES

[76] Inventor: William F. Loftus, 78a Ridge Road, Valley Cottage, N.Y. 10989

[22] Filed: May 2, 1975

[21] Appl. No.: 574,038

Related U.S. Application Data

[63] Continuation-in-part of Ser. No. 481,475, June 20, 1974, Pat. No. 3,939,570.

[52] U.S. Cl. ............................ 33/178 E; 33/174 P; 33/178 F
[51] Int. Cl.² ... G01B 5/12; G01B/7/28; G01B 5/20; G01B 7/12
[58] Field of Search ..................... 33/174 L, 33/174 P, 178 E, 178 F; 138/97; 104/138 R

[56] References Cited

UNITED STATES PATENTS

| 2,150,070 | 3/1939 | Kregecz | 33/178 F |
| 2,514,355 | 7/1950 | Barnes | 33/178 F |
| 2,527,170 | 10/1950 | Williams | 33/178 F |
| 3,535,803 | 10/1970 | Creek et al. | 33/178 F |
| 3,641,678 | 2/1972 | Murphey, Jr. et al. | 33/178 F |
| 3,718,978 | 3/1973 | Van Koevering et al. | 33/174 L |
| 3,886,665 | 6/1975 | Lowen | 33/174 L |
| 3,939,570 | 2/1976 | Loftus | 33/178 E |

Primary Examiner—Richard E. Aegerter
Assistant Examiner—Richard R. Stearns
Attorney, Agent, or Firm—Bruce H. Troxell

[57] ABSTRACT

Apparatus and process for determining and measuring the internal diameter of or the internal wear, pitting or thinning in a hollow pipeline, or the like, normally underground or underwater, whereby changes in the internal surface configuration or internal diameter of the pipeline at various points along its length are measured. The process includes measuring the changes in the internal configuration of the hollow pipeline, at various points along the length thereof and/or around the circumference thereof at various positions along the longitudinal axis thereof, and converting such measurements of changes in the internal configuration of the hollow pipeline into internal diameters or internal wear, pitting or thinning distance values. The apparatus includes rotatable means which enters and senses the distance of a straight line extending from the longitudinal axis of the apparatus to the internal surface of the pipeline in a predetermined radial direction at a predetermined point along the length of the pipeline. The rotatable sensing means also produces a signal representative of the distance of the line. The rotatable sensing means includes a linear potentiometer, and a rotatable sensing unit which includes a ball bearing mounted, in a universal movement manner, on the end of the shaft of the linear potentiometer. The apparatus also includes means for rotating the rotatable sensing means to the desired radial position, and means for moving the rotatable sensing means longitudinally in the pipeline to the desired point along the length of the pipeline.

4 Claims, 12 Drawing Figures

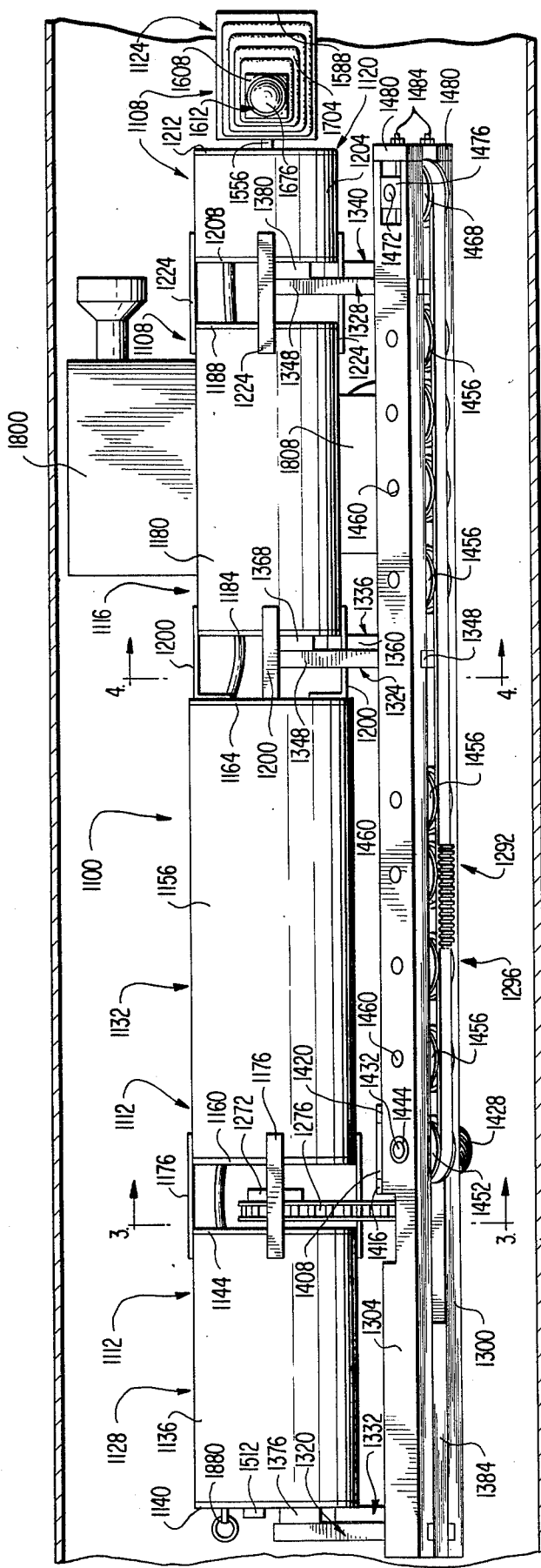

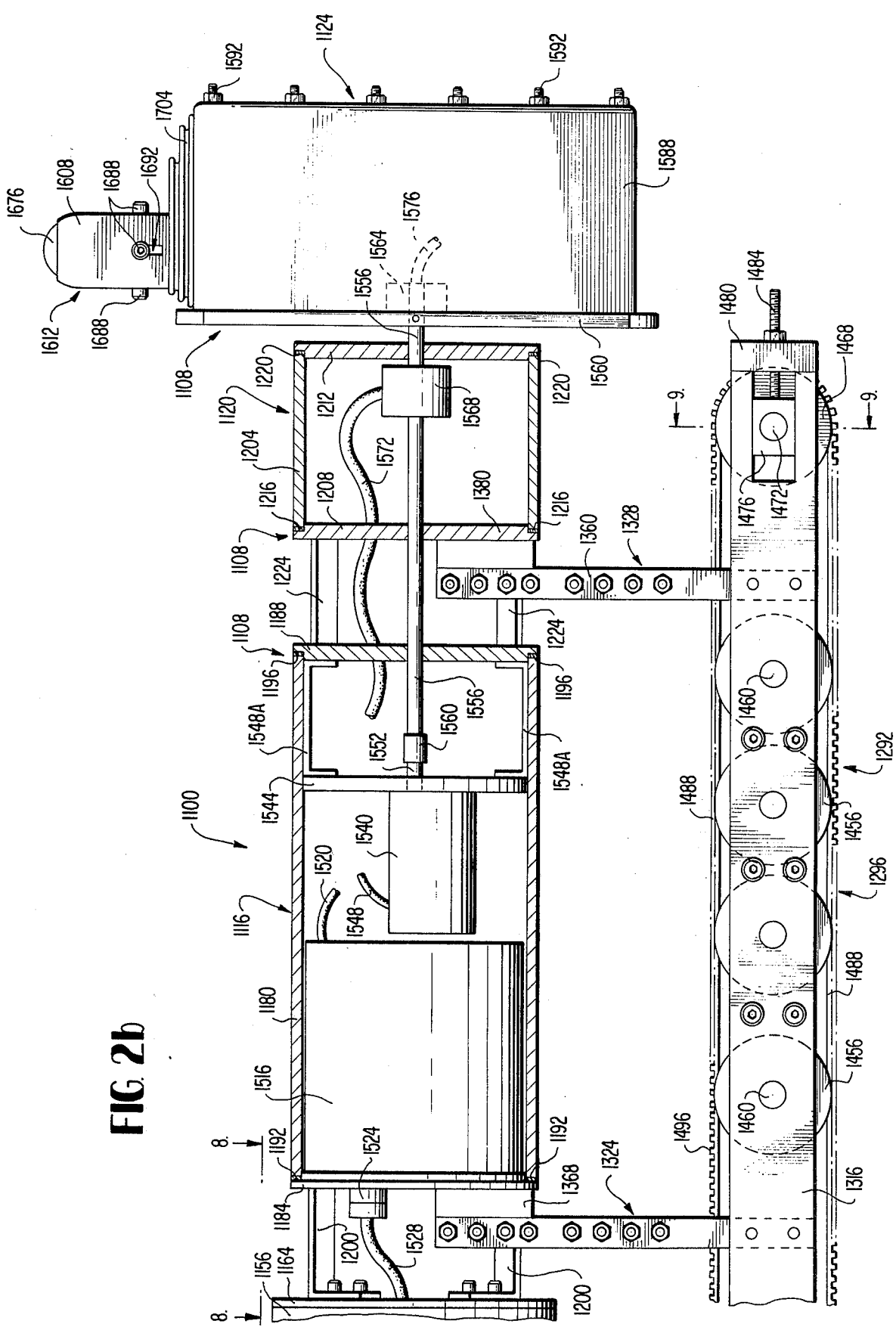

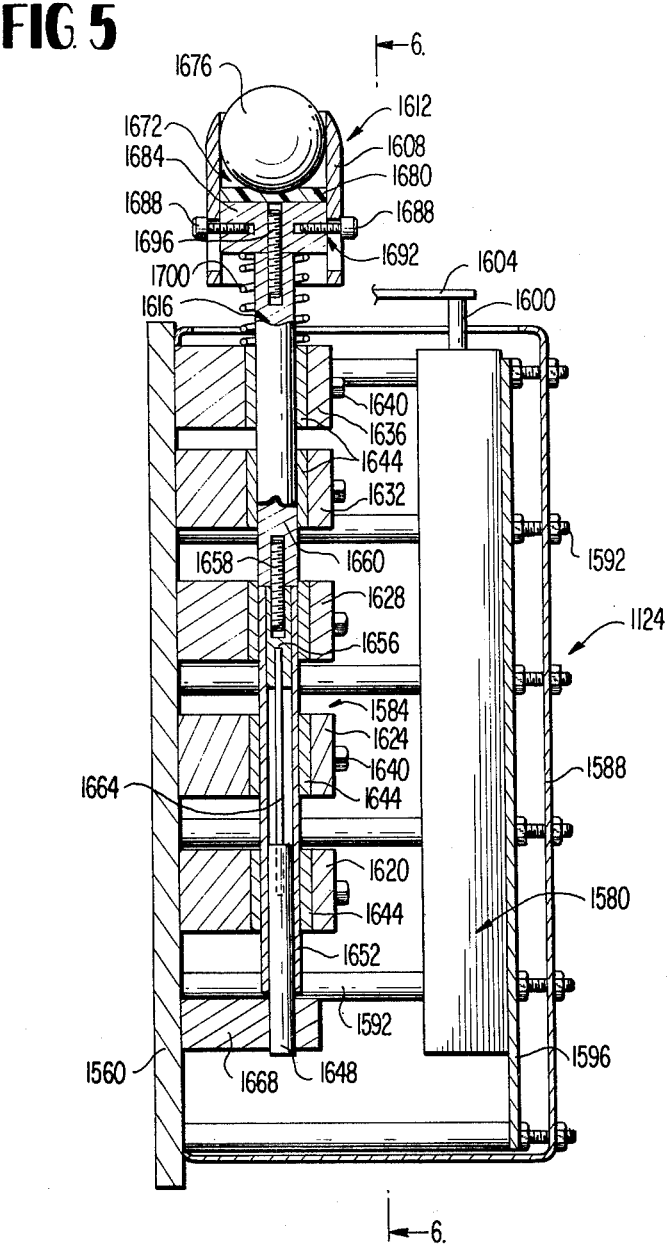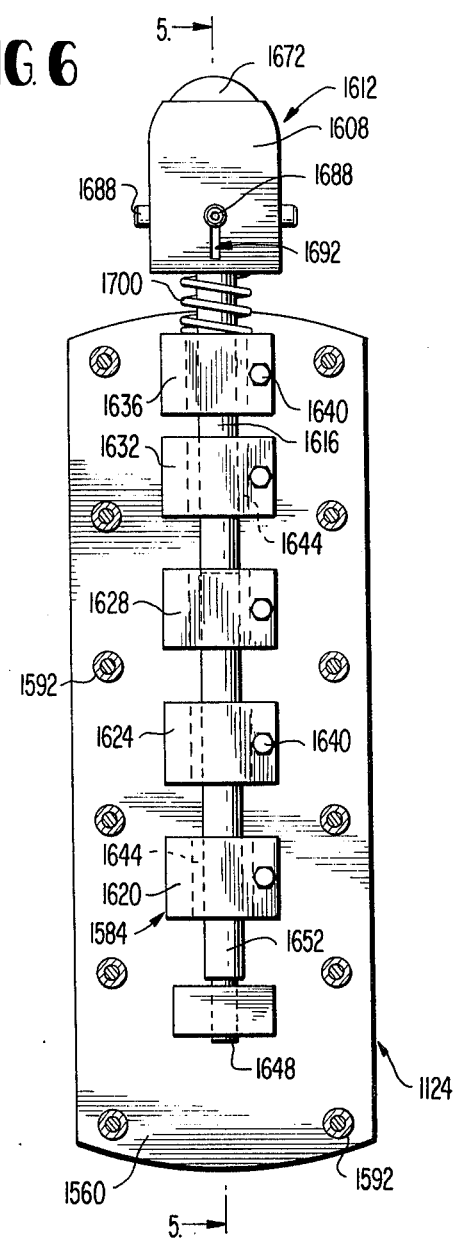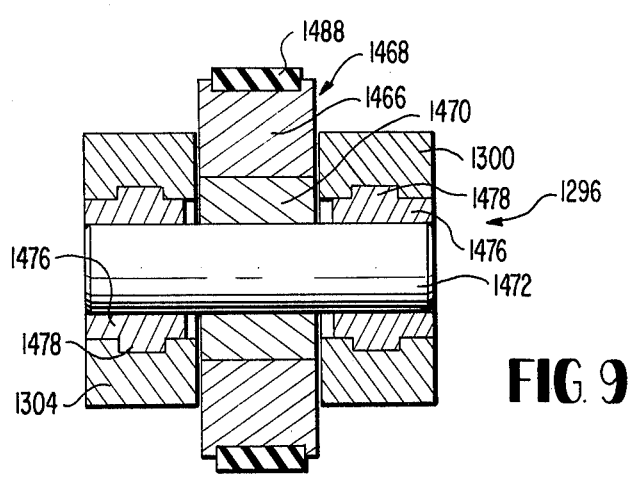

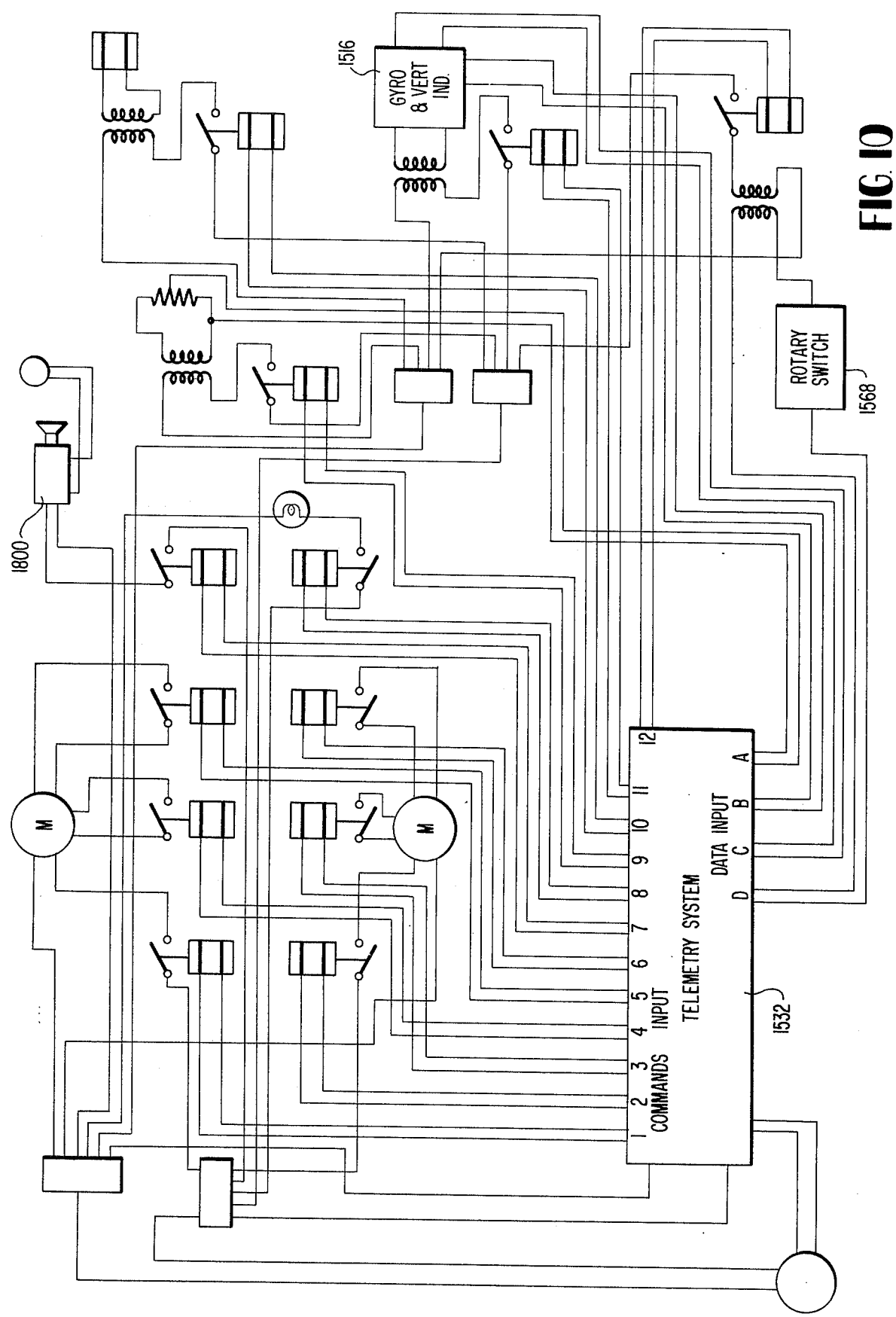

APPARATUS FOR AND PROCESS OF DETERMINING THE INTERNAL DIAMETER OF PIPELINES

This application is a continuation-in-part of my co-pending application Ser. No. 481,475, filed on June 20, 1974, now U.S. Pat. No. 3,939,570.

BACKGROUND OF THIS INVENTION

1. Field of This Invention

This relates to means for measuring the internal diameter, internal wear and the like in pipelines and the like at any location in such pipelines. This invention further relates to means for remotely and automatically indicating and recording such measurements.

2. Prior Art

In the past few years, a process of polyethylene lining of pipelines, be they gas, oil or sewer lines, has been used successfully. The lining is effected by inserting, section by section, the polyethylene pipe into the old pipe, thereby renewing a line which has been damaged or had its flow area reduced. When installed, the new polyethylene pipe has smooth fused joints which result in a line which has equal or better flow characteristics than the old line. It also has the asset of never (up to 50 years) allowing intra- or extra-filtration to occur, thus reducing the need for the original flow area. The construction process is as follows:

1. Each section between manholes is flushed out with flashlight visual inspection following;
2. If this cannot be accomplished, and approximately 90 percent of the time it cannot, then a TV camera is placed into the pipe. This camera is pushed or pulled along and restrictions, misalignments or obstructions are observed.
3. If the decision is made that these constrictions cannot be passed by the new lining, excavation at the suspected location is made and the restriction is then removed. The horizontal location of the restriction is a guess since the TV camera does not record distance along the pipe. In addition, the camera does not measure the size of the restriction.

U.S. Pat. No. 3,606,862 (Huff et al.) teaches an apparatus for applying a coating to the interior wall of a pipe. The coating apparatus includes a main body portion, several arcuate leaf springs mounted thereof that urge outwardly a corresponding number of rearwardly diverging centering vanes and a rotatable nozzle assembly (66a) coaxially mounted at the rear of the main body portion. Huff et al. shows ball bearings 88 mounted on the pipe wall end of the centering vanes — see FIG. 7. The ball bearings are not mounted on the rotatable nozzle assembly which contains a plurality of rearwardly and laterally directed jets. Col. 6 states that ball bearings 88 are provided to afford a substantially friction free movement of the coating apparatus without damaging the interior wall of the pipe.

U.S. Pat. No. 3,130,077 (Burden) claims an apparatus for applying a coating on the interior surface of a cylindrical body. Telescoping means are mounted on a frame located outside of the cylindrical body. Coating means 84 is mounted on the end of the tubular telescoping arm which extends furthest into the cylindrical body. While coating means (nozzle) 84 is adjustable in a pivotal manner, such is not the equivalent of the rotatable head of the present invention. It is noted that inner tubular member 60 is not stated to be rotatable in outer tubular member 59. FIG. 9 shows means for rotating the pipe itself. Inner tubular member is supported movably in the pipe to be coated by rollers or ball bearings 87 and 88.

U.S. Pat. No. 1,787,126 (Steinnes) teaches a device for coating the interior wall of a pipe. Tube $b$ is rotatable in casing $c$—supported by ball bearings $a'$ and $b'$ (for example). Tube $b$ rotates around stationary tube $a$. Ball bearings $a'$ and $b'$ are forced resiliently outwards. It is noted that at least one set of ball bearings are mounted on each side of peripheral brush $q$. The use of ball bearings on a rotatable head is shown—the ball bearings fittings are fixed in spatial arrangement so that the device can only be used for one size of pipe.

U.S. Pat. No. 3,149,646 (Xenis) teaches an apparatus for sealing leaks in pipes. The apparatus is mounted on wheeled platforms and incorporates a pair of oval shaped rollers for pressing a resilient ring against the internal wall of the pipe. U.S. Pat. No. 3,201,975 (Cook) discloses a method (and apparatus to achieve such) for locating a joint in an underground pipe. U.S. Pat. No. 3,547,040 (Baran) teaches a carriage capable of moving in a horizontal pipe. The carriage travels on wheels 6 and 10.

U.S. Pat. No. 2,971,259 (Hahnau et al.) discloses a camera mounted on or in sled means that is pulled along sewers to check for leaks. The camera is used to constantly detect a target body located a distance ahead of the camera — the camera signal is transmitted by cable to the surface.

U.S. Pat. No. 3,064,147 (Green et al.) teaches a pipeline surveying instrument. The instrument contains several T-shaped sliding, magnetic material, pipe followers 51, which fit in slots and are spring-biased outwardly against the wall. The tip of pipe followers 51 offer considerable friction resistance. U.S. Pat. No. 3,753,766 (Brown et al.) teaches a method for sealing a pipeline and apparatus for achieving such. Body portions 40 and 52 are carried on skid or runners 41 and 51. Slinger head 2 has a plurality of holes therein (for slinging out the curable sealing composition) but does not contact the pipeline wall for obvious reasons. U.S. Pat. No. 3,761,623 (Hara et al.) teaches an apparatus for examining the inner surface of pipes. The body of the apparatus contains a television camera. A camera head therefor is rotatably mounted on the television head. U.S. Pat. No. 3,718,978 (Koevering et al.) discloses a pipeline survey vehicle. Koevering uses a series of outwardly biased (spring) rotatable wheels 124 and 126 to measure vertical deflection in the pipe. U.S. Pat. No. 2,852,600 (Jenkins) discloses a well surveying system for inspecting a well piping. U.S. Pat. No. 3,285,447 (Junion) discloses a shop truck having two rows of ball bearing casters.

BROAD DESCRIPTION OF THIS INVENTION

An object of this invention is to provide an apparatus and a method for measuring the internal diameter of and/or the internal wear, pitting or thinning in a pipeline, and the like, at any location in such pipeline. A further object is to provide an apparatus and a method for remotely and automatically indicating and recording such measurements.

Another object of this invention is to provide a device and a process for measuring and recording the longitudinal and radial position in the pipeline where the diameter is being measured.

Another object of this invention is to provide an apparatus and process whereby any longitudinal profile of the internal wall of a pipeline can be made.

Another object of this invention is to provide a device and process whereby a helical profile of the internal wall of a pipeline can be made.

Another object of this invention is to provide a device which can be used across a fairly wide range of internal diameters (i.e., different diametered pipelines).

Another object of this invention is to provide an apparatus and a method for measuring with extreme accuracy the internal configuration of a pipeline.

Another object of this invention is to provide a device which has a self-contained drive means.

Another object of this invention is to provide a device which has television camera means and lighting means.

Another object of this invention is to provide a device which is capable of measuring the diameter of a tube or pipeline.

Another object of this invention is to provide a device which is capable of ascertaining its longitudinal position in a pipeline or tube.

Other objects and advantages will be apparent to one ordinarily skilled in the art from the following description, taken in connection with the accompanying drawings. This invention achieves such objects and has such advantages.

The apparatus of this invention broadly involves means for determining and measring the internal diameter of or the internal wear, pitting or thinning in a hollow pipeline, normally located underground or underwater, whereby changes in the internal surface configuration or internal diameter of the pipeline at various points along its length are measured, and for means for converting such measurements of change in the internal configuration of the hollow pipeline into internal diameters or internal wear, pitting or thinning distance values.

The apparatus of this invention includes rotatable sensing means for entering and sensing the distance of a straight line extending from the longitudinal axis of said apparatus to the internal surface of the pipeline in a predetermined radial direction at a predetermined point along the length of the pipeline and for producing a signal representative of the distance of the line. The apparatus also includes means for rotating the rotatable sensing means to the desired radial position, and means for moving the rotatable sensing means longitudinally in the pipeline to the desired point along the length of the pipeline.

An advantage of this invention is that the apparatus does not have to be returned to the surface and opened before any of the measured data can be obtained. The automatic and continuous recording features of this invention allow the instantaneous delivery of data (with correlation of its vertical and radial position in the pipeline) in a recorded and visual form to the surface observor.

The apparatus of this invention travels inside of a pipeline, checks for and measures any diameter changes (or diameter), and indicates any such diameter changes (or diameter) and its longitudinal and axial location in such pipeline. The apparatus of this invention has the advantage of remote readings of any such diameter changes (quantitative) and their locations.

The apparatus of this invention measures the thinning, wear or pitting in a pipeline by measuring the change in the internal diameter of the pipeline.

Another advantage of the apparatus of this invention is that its measurements can be used as a guide to ascertain if the pipeline needs to be replaced, etc.

The apparatus of this invention will determine if there has been an increase or decrease of the internal diameter of the pipeline.

Preferably the apparatus of this invention uses a rotatable sensing means which includes a linear potentiometer for producing the signal representative of the measured distance (internal diameter). A potentiometer recorder, for example, a digitalized potentiometer recorder, located on the surface, is used to measure and record said signal representative ground of said distance. In this case, the signal can be measured by measuring means located on the interior pipeline and can be recorded by recording means located on the ground or water surface.

The apparatus can include a television camera for visual inspection of the pipeline (the signal from the television camera being received by television receiving means located on the ground or water surface) and a floodlight.

The apparatus of this invention can be made to be accurate to 0.001th of an inch.

Another advantage of the apparatus of this invention is that when an obstruction, such as, an offset interface of two pipe sections, is encountered in a pipeline by the apparatus of this invention, there is no impediment of or slowing down of the progress of the apparatus. This is particularily so in the embodiment of this invention which uses drive belts instead of drive wheels. It is also so where so spring biased wheel is used. The reason being that when a biased wheel is involved — such wheel can be caught by the impediment (and for that matter in a side channel in the pipeline) and cannot be easily dislodged, stopping the forward progress of the apparatus. Such does not occur when drive belts are used.

One embodiment of this invention involves apparatus which includes rotatable sensing means that has a body member, a linear potentiometer, a rotatable sensing unit which includes a ball bearing mounted, in a universal movement manner, on the end of the shaft of said linear potentiometer, and a solenoid connected to such shaft. The ball bearing is rotated in a plane normal to the longitudinal axis of the pipeline. The solenoid urges the ball bearing against the internal wall of the pipeline when the solenoid is inactivated and disengaging the ball bearing from the internal wall when the solenoid is activated. The linear potentiometer produces a signal representative of the distance indicated by the ball bearing engaging the internal wall of the pipeline. The rotatable sensing unit is rotated by means of a motor, mounted in the body member, which turns a shaft upon which the rotatable sensing unit is mounted. Means for moving the apparatus longitudinally in the pipeline comprises two motor-driven belts which engage the internal wall of the pipeline. The motor-driven drive belts are mounted on the outside of the body member. The motor-driven drive belts are located at about 90°, on a cross-section of said apparatus, to each other. A winch cable can be attached to the body member, the winch cable being movable by a surface-located motor-driven winch and being used for safety retrieval purposes. The shaft of the linear potentiometer is adjustable in length so that the rotatable sensing means can be used in pipelines having substantially different internal diameters. The measurement method using the apparatus of this invention can utilize direct analog voltages corresponding with the measurements generated by the instrument in the pipeline and sent to the ground surface by the telemetry system which first converts the analog voltages into ASCII or logic signals which are then fed into teletype digital print-out on the ground surface and a CRT terminal where they are displayed on a screen.

This embodiment of this invention is a modification of the specific pile scanning device described in my co-pending U.S. application Ser. No. 481,475. For example, the rotatable flat wheel at the perimeter of the revolving head has been replaced by a ball bearing. This embodiment's instrument relates to a pipeline survey wherein the instrument is conducted through the pipeline, pile or the like. (The revolving end portion before included a rotatable wheel measuring device and support, etc. The survey portion, i.e., rotatable wheel, of the instrument could be rotated through 360° to measure the restructure of the pipeline or pile at a particular location.) In this embodiment the rotatable measuring wheel has been replaced with a ball bearing wheel. This eliminates the mechanism necessary to rotate the measuring wheel through an arc of 90° to allow 360° rotation of the measuring head of the instrument—or eliminates the need to bring the instrument to the surface to rotate the measuring wheel. One advantage is that the pipe can be circumferentially measured (swept) in a perpendicular plane without having to rotate the arm carrying the ball bearing. The ball bearing arm can be locked against rotation and the instrument longitudinally sent along the pipe, recording the wall profile as it travels. Several ball bearing arms can be used on one instrument, allowing several profiles to be obtained simultaneously. Another important advantage is that the head can be rotated while maintaining a constant overall instrument longitudinal velocity—a helical measurement pattern results.

This invention also involves a process for determining and measuring the internal diameter of or the internal wear, pitting or thinning in a hollow pipeline, or the like, normally located underground or underwater, whereby changes in the internal surface configuration or internal diameter of the pipeline at various points along its length are measured. The process includes measuring the changes in the internal configuration of the hollow pipeline, at various points along the length thereof and/or around the circumference thereof at various positions along the longitudinal axis thereof, and converting such measurements of changes in the internal configuration of the hollow pipeline into internal diameters or internal wear, pitting or thinning distance values. The measurements and said conversions can be made on a continuous basis, and the conversions can be automatically recorded.

The process of this invention also involves the making of continuous internal diameter determinations along a helical path on the internal wall of a pipeline.

Preferably the pipeline has a cross-sectional configuration that is circular, but various cross-section configurations can be measured by the apparatus of this invention. Examples of such cross-sectional configurations are circular (preferred), oblong, square, rectangular, hexagonal, elliptical, etc. Furthermore, the pipe piling need not have a straight longitudinal axis, but can have a curved longitudinal axis.

This invention is not restricted to the measurement of internal diameters in empty pipelines, but can be used to make such measurements in any pipe in any environment. Pipes used to carry fluids, acting as conduits for electrical cables, etc., can be measured. The pipes should be cleared of all fluids, cables, etc., before the apparatus of this invention is used, but clearance of fluids is not essential. Exceptions would be that the apparatus of this invention can be used in nitrogen and similar gaseous atmospheres; in fact, if properly encased, the apparatus of this invention can be used in liquid environments. The apparatus of this invention can be used under pressures which are greater than or less than atmospheric pressure. The pipes can be buried in the earth, immersed in fresh or sea water, laying on the ground, suspended in the air, etc. Also the pipes can be vertically located or at an angle, including horizontally located. The apparatus of this invention can be used for measuring internal diameter, etc., in long distance oil and gas pipelines (usually cleared of product) by use of radio guidance means and radio data transmission means.

The apparatus of this invention can be miniaturized to measure pipes having an inside diameter of less than 10 inches.

DETAILED DESCRIPTION OF THIS INVENTION

This invention is described in more detail in the drawings in which:

FIG. 1 is a side elevational view of the pipeline measuring or scanning device of this invention;

FIG. 2b is a sectional elevational view of the pipeline measuring segment of the preferred apparatus of this invention, taken along line 2b-2b in FIG. 4;

FIG. 5 is a view in cross-section taken along line 5—5 in FIG. 6;

FIG. 6 is a view in cross-section taken along line 6—6 in FIG. 5;

FIG. 7 is a view taken in cross-section, taken along line 7—7 in FIG. 2a;

FIG. 8 is a partial top elevational view, taken along line 8—8 in FIG. 2b.

FIG. 9 is a view taken in cross-section, taken along line 9—9 in FIG. 2b;

FIG. 10 is a wiring diagram of the circuitry of the apparatus of FIGS. 1 to 9.

Figure 2A:
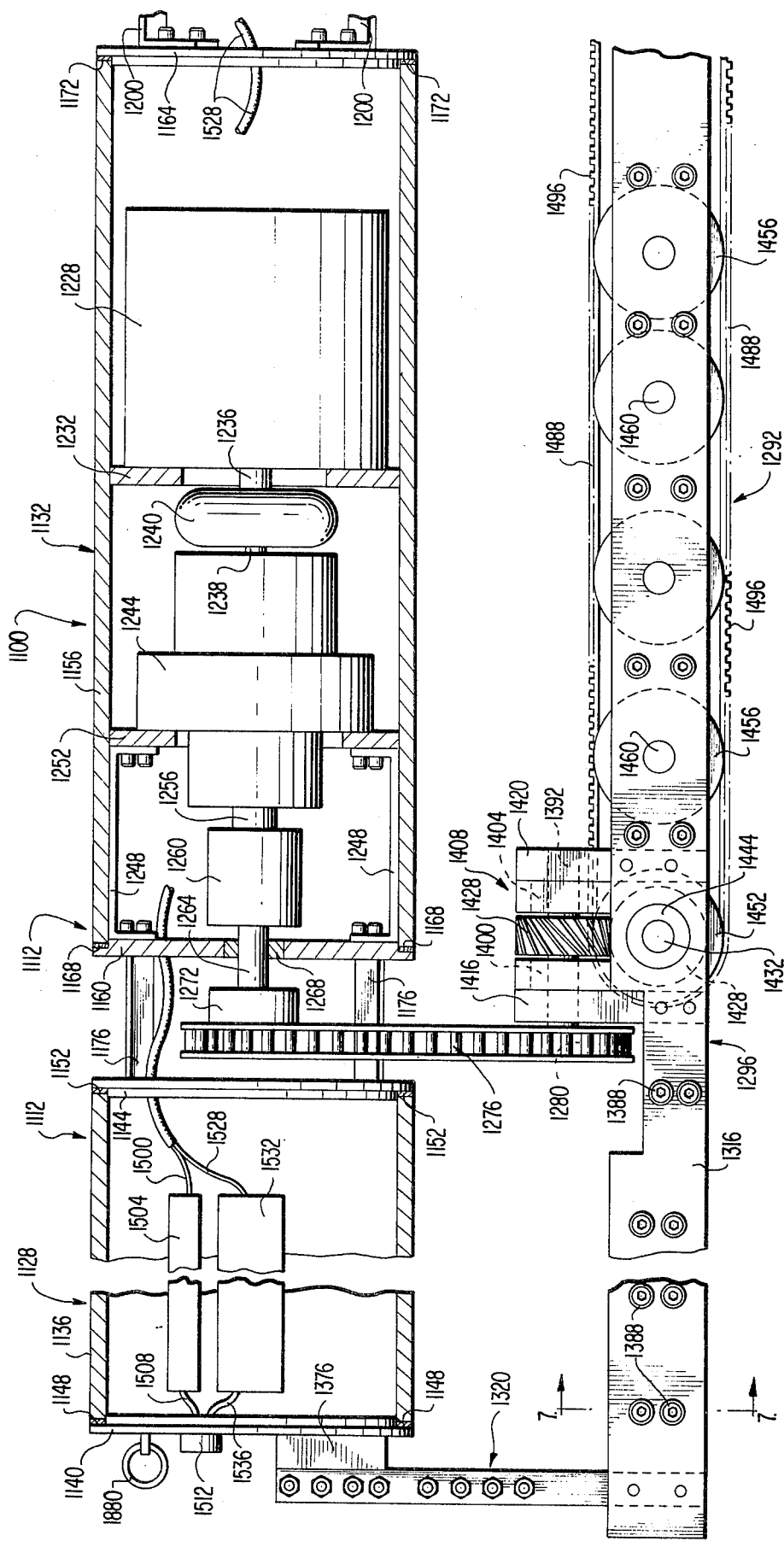
FIG. 2a is a sectional elevational view of the drive segment of the preferred apparatus of this invention, taken along line 2a-2a in FIG. 3.

FIGS. 1 to 10 represent the preferred embodiment of the apparatus of this invention. Pipeline scanner 1100 is located inside of (hollow) pipeline 1104 and includes pipeline scanner unit 1108 and drive unit 1112. See FIGS. 1, 2a and 2b. Pipeline scanner unit 1108 includes segment (termed "head motor housing") 1116 segment 1120 (termed "commutator housing") and rotatable measuring subassembly 1124. Drive unit 1112 includes segment 1128 (termed "control housing") and motor segment 1132 (termed "drive motor housing"). Segment 1128 of drive unit 1112 includes tubular casing 1136, upper cover plate 1140 (termed "end plate") and lower cover plate 1144 (termed "control housing plate"). A portion of upper cover plate 1140 fits into tubular casing 1136 and a portion fits over the top rim of tubular casing 1136 — seal 1148 is located between upper cover plate 1140 and the top rim of tubular casing 1136. Seal 1148 can be made of any suitable sealant material, but preferably in an "O" ring neoprene seal. Screws (not shown) hold upper cover plate 1140 to casing 1136. A portion of lower cover plate 1144 fits into tubular casing 1136 and a portion fits over the bottom rim of tubular casing 1136 — seal 1152 is located between cover plate 1144 and the bottom rim of tubular casing 1136. Seal 1152 can be made of any suitable sealant material, but preferably is an O ring neoprene seal. Screws (not shown) hold lower cover plate 1144 to casing 1136. Segment 1128 of drive unit 1112 is a completely sealed unit which is vapor and liquid impenetrable — this is preferred so as to make sure that vapors and liquids do not foul and cause problems with the internal components of segment 1128 of drive unit 1112.

Segment 1132 of drive unit 1112 includes tubular casing 1156, top cover plate 1160 (termed "gearhead face plate") and lower cover plate 1164 (termed "drive motor face plate"). A portion of top cover plate 1160 fits into tubular casing 1156 and a portion fits over the top rim of tubular casing 1156 — seal 1168 is located between upper cover plate 1160 and the top rim of tubular casing 1156. Seal 1168 can be made of any suitable sealant material, but preferably is an "O" ring neoprene seal. Screws (not shown) hold top cover plate 1160 to casing 1156. A portion of lower cover plate 1164 fits into tubular casing 1156 and a portion fits over the bottom rim of tubular casing 1156 — seal 1172 is located between lower cover plate 1164 and the bottom rim of tubular casing 1156. Seal 1172 can be made of any suitable sealant material, but preferably is an O ring neoprene seal. Screws (not shown) hold lower cover plate 1164 to casing 1156. Segment 1132 is a completely sealed unit which is vapor and liquid impenetrable. Segment 1128 is attached to segment 1132 by means of four connecting arms or brackets 1176, which are mounted by screws onto tubular casing 1136 and tubular casing 1156.

Segment 1116 of pipeline scanner unit 1108 includes tubular casing 1180, top cover plate 1184 (termed "guide wheel mounting plate") and lower cover plate 1188 (termed "motor case plate"). A portion of top cover plate 1184 fits into tubular casing 1180 and a portion fits over the top rim of tubular casing 1180 — seal 1192 is located between upper cover plate 1184 and the top rim of tubular casing 1180. Seal 1192 can be made of any suitable sealant material, but preferably is an O ring neoprene seal. Screws (not shown) hold top cover plate 1184 to casing 1180. A portion of lower cover plate fits into tubular casing 1180 and a portion fits over the bottom rim of tubular casing 1180 — seal 1196 is located between lower cover plate 1188 and the bottom rim of tubular casing 1180. Seal 1196 can be made of any suitable sealant material, but preferably is an O ring neoprane seal. Screws (not shown) hold lower cover plate 1188 to casing 1180. Segment 1116 is a completely sealed unit which is vapor and liquid impenetrable. Tubular casing 1180 has a slightly smaller diameter than tubular casing 1156. Four L-shaped brackets 1200 are mounted by screws on lower cover plate 1164. The top portions of brackets 1200 are mounted on casing 1180, thereby attaching casing 1156 to casing 1180.

Segment 1120 of pipeline scanner unit 1108 includes tubular casing 1204, top cover plate 1208 (termed "guide wheel mounting plate") and lower cover plate 1212 (termed "face plate"). A portion of top cover plate 1208 fits into tubular casing 1204 and a portion fits over the top rim of tubular casing 1204 — seal 1216 is located between top cover plate 1208 and the top rim of tubular casing 1204. Seal 1216 can be made of any suitable sealant material, but preferably is an O ring neoprene seal. Screws (not shown) hold top cover plate 1208 to casing 1204. A portion of lower cover plate 1212 fit into tubular casing 1204 and a portion fits over the bottom rim of tubular casing 1204 — seal 1220 is located between lower cover plate 1212 and the bottom rim of tubular casing 1204. Seal 1220 can be made of any suitable sealant material, but preferably is an O ring neoprene seal. Screws (not shown) hold lower cover plate 1212 to casing 1204. Segment 1120 is a completely sealed unit which is vapor and liquid impenetrable. Segment 1116 is attached to segment 1120 by means of four connecting straps or brackets 1224, which are mounted by screws onto tubular casing 1180 and tubular casing 1204.

Eyelet hook 1880 mounted on cover plate 1140, can be used to attach a safety-retrieval cable that extends to the surface.

Segment 1132 contains drive motor 1228 which is mounted on motor plate 1232 which is mounted in casing 1156. Drive motor 1228 is an A.C., capacitor run, reversible, variable-speed, non-sychronous motor. Shaft 1236 of drive motor 1228 is connected to shaft 1238 of gearhead 1244 by means of coupling 1240. Shaft 1236 extends through a centrally-located hole in motor plate 1232. U-shaped spacing brackets 1248 are mounted on the inside of casing 1156 on the end away from drive motor 1228. Gearhead plate 1252 is mounted on one leg of brackets 1248, and the other leg of brackets 1248 is mounted on top cover plate 1160. Gearhead 1244 is mounted on gearhead plate 1252. Part of gearhead 1244 extends through a centrally-located hole in gearhead plate 1252. Shaft 1256 of gearhead plate 1252 is connected by means of shaft coupling 1260 to drive sprocket shaft 1264. Drive sprocket shaft 1264 is rotatably mounted in bearing seal 1268 which is located in the center of top cover plate 1160 and which is vapor and liquid impenetrable.

Figure 3:
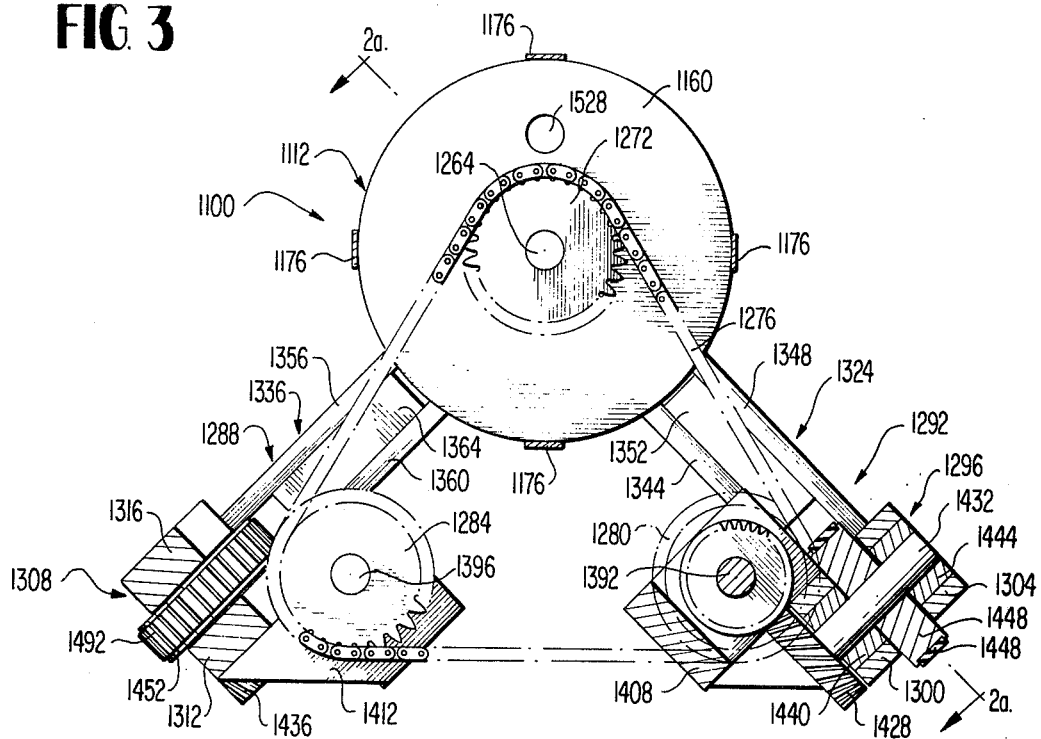
FIG. 3 is a view in cross-section, taken along 3—3 of of FIG. 1.
Figure 4:
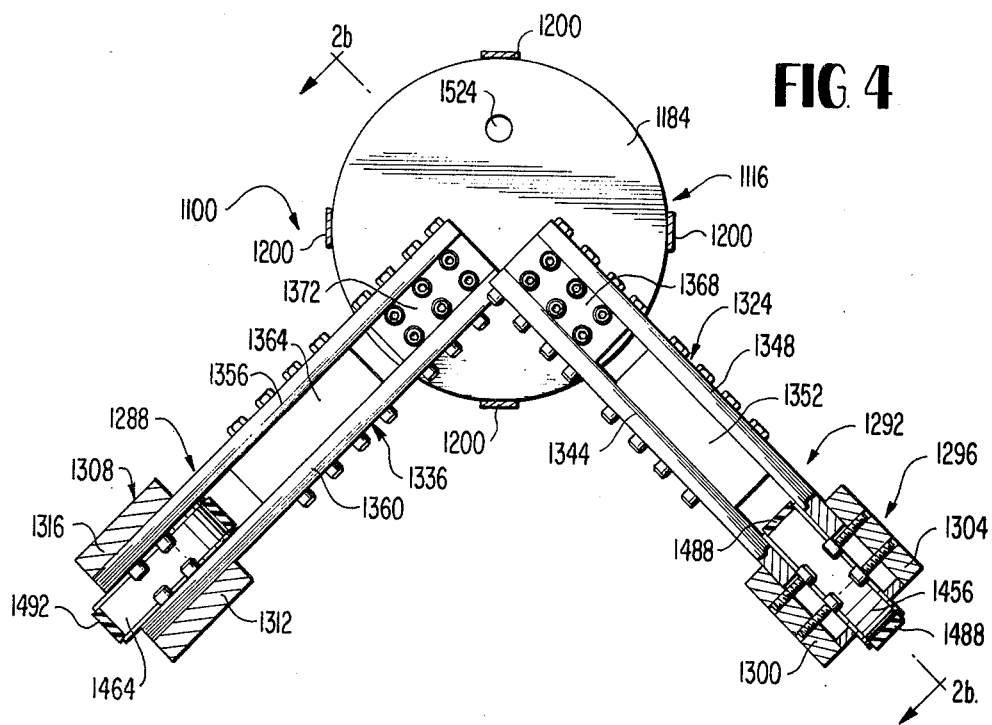
FIG. 4 is a view in cross-section taken along line 4—4 in FIG. 1.

As best seen in FIGS. 2a and 3, drive sprocket 1272 (mounted on drive sprocket shaft 1264) drives drive chain 1276 to effect movement of pipeline scanner 1100. Drive chain 1276 also continues around drive sprocket 1280 and drive sprocket 1284. Drive sprocket 1280 and drive sprocket 1284 are part of drive belt unit 1288 and drive belt unit 1292, respectively. As viewed in FIGS. 3 and 4, drive belt unit 1288 is on the left and drive belt unit 1292 is on the right. The description herein of drive belt unit 1292 generally applies to drive belt unit 1288, since only drive belt unit 1292 is shown in FIGS. 1, 2a, 2b and 3. Roller support 1296 of drive belt unit 1292 includes inner plate 1300 and outer plate 1304. (Roller support of 1308 of drive belt unit 1288 includes inner plate 1312 and outer plate 1316). Roller support 1296 is mounted on segment 1128 by connecting arm 1320, on segment 1116 by connecting arm 1324 and on segment 1120 by connecting arm 1328. (Roller support 1308 is mounted on segment 1128 by means of connecting arm 1332, on segment 1116 by connecting arm 1336 and on segment 1120 by connecting arm 1340). Each of such connecting arms includes two outer arms and a center space block, which are bolted together. FIG. 4, for example, shows arms 1344 and 1348 and center spacing block 1352 of connecting arm 1324 (and arms 1356 and 1360 and center spacing block 1364 of connecting arm 1336). As shown in FIG. 4, the connecting arms (1320, 1324 and 1328) for drive belt unit 1292 are at a right angle to the connecting arms (1332, 1336 and 1340) for drive belt unit 1288). Each connecting arm is connected to (bolted to) an end spacing block which is mounted on (bolted on) a top cover plate of one of the segments. As shown in FIGS. 4 and 8, the end of arms 1344 and 1348 of connecting arm 1324 are connected to end spacing block 1368, which is mounted on top cover plate 1184 (and the end of arms 1356 and 1360 of connecting arm 1336 are connected to end spacing block 1372, which is mounted on top cover plate 1184). As shown in FIG. 8, end spacing block 1368 is thicker than end spacing block 1372, which offsets connecting arm 1324 from connecting arm 1336. Similarly, connecting arms 1320 and 1332 are mounted on top cover plate 1140 by means of offset end spacing blocks (1376 and connecting arms 1328 and 1340 are mounted on top plate 1208 by means of offset end spacing blocks 1380 and 1328).

As shown in FIGS. 1 and 4, the end of the outer arm (e.g., 1348) of the connecting arms (e.g., 1324) are set in vertical channels in the outer arm (e.g., 1304) of the roller supports (e.g., 1296) and bolted or screwed thereto.

That portion of inner plate 1300 and outer plate 1304 under segment 1128 is held apart by spacer block 1384 — see FIG. 7. Bolts 1388 extend through inner plate 1300, and spacer block 1384 and outer plate 1304. This gives stability and spacing to this end of roller support 1296.

Drive sprocket 1280 is mounted on drive shaft 1392 (and drive sprocket 1284 is mounted on drive shaft 1396). Drive shaft 1392 is rotatably mounted in bearings 1400 and 1404 in transmission block 1408. (Drive shaft 1396 is similarly mounted in transmission block 1412.) Transmission face plates 1416 and 1420 hold transmission block 1408 in place between inner plate 1300 and outer plate 1304. Drive gear 1424 (having teeth at a 45° angle to the plane of rotation) is mounted on shaft 1392. Drive gear 1424 meshes with drive gear 1428 (having mating teeth at a 45 degree angle to the plane of rotation), which is mounted on drive shaft 1432. This is best seen in the cut-away portion of FIG. 3. (See drive gear 1436 which corresponds to drive gear 1428). Drive shaft 1432 is rotatably mounted in bearings 1440 and 1444 which are respectively mounted in inner plate 1300 and outer plate 1304.

Drive pully 1448 is rotably mounted on drive shaft 1432 (see corresponding drive pulley 1452 of drive belt unit 1288). Eight guide pulleys 1456 (in two sets of four) are mounted on shafts 1460, which are rotably mounted in inner plate 1300 and outer plate 1304. (See corresponding guide-pulley 1464) of drive belt unit 1288 in FIG. 4.) Tension-guide pulley 1468 is mounted on shaft 1472, which is rotably mounted in take-up spindles 1476. (Tension-guide pulley 1468 is made up of portions 1466 and bearing 1470). Take-up spindles 1476 are slidably mounted in a horizontal slot in the end of inner plate 1300 and outer plate 1304. Take up spindles 1476 have lips 1478 that fit in the grooves shown by FIG. 9 inner plate 1300 and outer plate 1304.

A tension block 1480 is mounted on the slotted end of outer plate 1304 — one is also mounted on the slotted end of inner plate 1300. Tension bolt 1484 is turnably mounted in a threaded passageway in tension block 1480 and is turnably mounted (on its end) in take-up spindle 1476. (see FIG. 9). This allows a tension adjustment re drive pulley 1448, guide pulleys 1456 and tension-guide pully 1468. Drive belt 1488 is mounted on drive pulley 1448, guide pulleys 1456 and tension-pulley 1468. The afore-described tension adjustment means allows tension adjustment re drive belt 1488 (and similarly on drive belt 1492 of drive belt unit 1288). Drive belt 1488 has a series of teeth 1496 along its entire length (so does drive belt 1492) which assists in obtaining good traction in the pipeline.

Drive motor 1228 is electrically connected, via electrical cable 1500, that passes top cover plate 1160 and lower cover plate 1144, to speed controller 1504. Speed controller 1504 allows the changing and controlling of the movement of pipeline scanner 1100 in pipeline 1104 and allows the reversing of drive motor 1228, which effects a reversing of direction of pipeline scanner 1100. Speed controller 1504 is electrically connected, via electrical cable 1508 and connector 1512 (in top plate cover) and a further electrical cable (not shown) to a surface power unit (not shown).

Gyroscope 1516 is mounted in the back end of casing 1180. Gyroscope 1516 serves as a horizontal and vertical indicator for pipeline scanner 1100. Gyroscope 1516 is electrically connected via an electrical cable to electrical connector 1524 (mounted in top cover plate 1184 and electrical cable 1528, to telemetry system 1532), which is mounted in casing 1136. Telemetry system 1532 is electrically connected with a surface indicating-recording unit (not shown) via electrical cable 1536 and electrical connector 1512.

The use of the two drive belt units at a 90° angle keeps pipeline scanner 1100 on a true vertical alignment in pipe 1104. The weight of pipeline scanner, with the arrangement of the two drive belt units, maintains this true alignment of pipeline scanner 1100.

Head motor 1540 is mounted on plate 1544 in casing 1180 and is electrically connected, via electrical cable 1548, electrical cable 1520, electrical connector 1524 and electrical cable 1528 to tememetry system 1532 and a surface power supply. Head motor plate 1544 is mounted on C-shaped brackets 1548A, which are mounted on bottom cover plate 1188. Head motor 1540 is an A.C. capacitor run, constant speed, reversible, non-synchronous motor. Shaft 1552 of motor 1540 is connected to hollow transmission casing 1556 via shaft connector 1560. Casing 1556 extends through a hole (not shown, but see FIG. 2a) in bottom cover plate 1188, through a hole (not shown) in the center of head plate 1560 and through a hole (not shown) in holding coupling block 1564 (which attaches casing 1556 to head plate 1560). A seal is mounted around casing (shaft) 1556 every place it exits to the outside — such seals are vapor and liquid impenetrable. There are rubber (or similar type of material) seals whereever there are holes exiting to the outside of segments 1116, 1120, 1124, 1128, and 1132.

Commutator switch 1568 is mounted on transmission casing 1556 just above lower cover plate 1212. Transmission casing 1556 is hollow from the mounting point of commutator switch 1568 to its end on the extreme face of coupling block 1564. Electrical cable 1572 electrically connects commutator switch with electrical connector 1524 and hence with telemetry system 1532. Electrical cable 1576, which is electrically connected with commutator switch 1568, passes down the hollow portion of transmission casing 1556 into rotatably measuring subassembly 1124. The use of commutator switch 1568, which is a rotary switch and electrical connector, allows the maintenance of electrical connection with rotatable measuring subassembly 1124 and closure to the outside environment to segment 1120 and rotatable measuring subassembly 1124 while being able to use head-motor 1540 to rotate rotatable measuring subassembly 1124 to any desired radial position. Transmission casing 1556 can be completely rotated as many times as desired in either direction. This is an advantage over the specific embodiment of my earlier pile scanner (of my copending application serial no. 481,475) which uses solenoid stops, a stop pin and a cable which ran entirely through a hollow connecting shaft a rotatable measuring head — such an arrangement was restricted to a maximum of 360° rotation.

Electrical cable 1576 is electrically connected to retraction solenoid 1580 and potentiometer assembly 1584. Rotatable measuring subassembly 1124 includes plate 1560, cover 1588 (which is mounted on plate 1560 by means of fixed bolt arms 1592) and plte 1596 (which is mounted on fixed bolt arms 1592), retraction solenoid 1580 and potentiometer assembly 1584. Solenoid 1580 is mounted on plate 1596. Solenoid 1580 includes solenoid shaft 1600 and solenoid extension plate 1604 (one end of which is mounted on the other end of solenoid shaft 1600). See FIG. 5. Solenoid extension plate 1600 is mounted on its other end the top portion of the back side of bearing block 1608 of measuring ball bearing unit 1612. Shaft 1616 is mounted in passageways in potentiometer holding (or alignment) blocks 1620, 1624, 1628, 1632 and 1636 of potentiometer assembly 1584. Each potentiometer holdings blocks includes a key hole slot which is closed by bolt 1640. The key hole slot contains bushings 1644, in which potentiometer casing 1608 is mounted. Potentiometer assembly 1584 includes a linear position transducer (potentiometer 1648), potentiometer casing 1652, a potentiometer adapter 1656 and shaft extender 1660 that is connected to potentiometer adapter 1656 by threaded shaft 1658). Shaft 1664 moves in and out of a passageway in linear position transducer 1648 and casing 1652 moves outside of transducer 1648. Calibration block 1668 is mounted on plate 1560 on the axis of shaft 1616 behind potentiometer assembly 1394. See FIG. 6.

Measuring ball bearing unit 1612 is mounted on the end of shaft 1616 and is mounted horizontal to the longitudinal axis of pipeline scanner 1100 and pipeline 1104. Bearing block 1608 contains passageway 1672, which has a slightly reduced diameter near the outer face of bearing block 1608. Ball bearing 1676 is mounted in passageway 1672, protruding slightly out thereof. Bearing disc 1680 (having an indent in the center that mates with ball bearing 1676) is urged against ball bearing 1676 by bearing block filler 1684. Bearing block filler 1684 is positioned in passageway 1672 by screws 1688 that extend through slots 1692 in bearing block 1608. Bearing block filler 1684 is attached to shaft extender by threaded shaft 1696. Shaft spring 1700 (e.g., 5 pounds compression) fits over shaft 1616 and its ends contact block 1636 and bearing block filler 1684. Bellowed rubber boot 1704 rims the open side of cover 1588 and fits around solenoid connecting bracket 1604 and the base of bearing block 1608. Measuring ball bearing 1676 contacts the inside wall of pipeline 1104 when solenoid 1580 is in the inactive position (being urged against the inside pipeline wall by shaft spring 1700). When solenoid 1580 is actuated, measuring ball bearing 1676 is drawn in (overcoming the outward force of shaft spring 1700).

Optionally television camera 1800 can be mounted on pipeline scanner 1100, for example, on top of casing 1180 (see FIG. 1). Television camera 1800 is mounted so as to give a picture of pipeline 1104 in front of pipeline scanner 1100. A television receiver (not shown) is used on the surface.

Optionally floodlight 1808 can be mounted on pipeline scanner 1100, for example, on the bottom of casing 1180 (see FIG. 1). Floodlight 1808 is normally used in conjunction with television camera 1800.

Typically, head motor 1540 can be a 1/50 H.P. Bodine Motor, having a 9.4 rpm. a torque of 40 in. — lbs, is a NCI type and is a 115V Ac Cap. Rev. OBB. Typically gear motors 1228 can be a ⅓ H.P. reversible motor made by B & B Motors, Inc. Typically, speed controller 1504 is one made by B & B Motors, Inc., that is compatible with such a gear motor 1228. Typically, retract solenoid 1580 can be one made by Regdon Corporation.

The surface recording means can be a potentiometric recorder (preferred) or other suitable recording means. The potentiometric recorder can be Model 400 Potentiometric Recorder made by Rustak Instrument Div. of Gulton Industries, Inc., Manchester, New Hampshire. Use of a digitalized surface recording unit has a number of obvious advantages. A useful digitalized surface recording unit is a teletype KSR 33 by Teletype Incorporated in conjunction with a CRT terminal Model 480 by Conrac Corp. of California.

FIG. 10 is a self-explanatory wiring diagram of the circuitry of the apparatus of FIGS. 1 to 9.

The preferred embodiment of the process of this invention involves the use of the preferred embodiment of this invention (as embodied in FIGS. 1 to 9).

Pipelines can contain water various chemicals in gaseous and liquid form. These and other factors make it necessary to enclose several portions of pile scanner 1100 to protect it from liquids (and vapors). Such also protects the enclosed portions from colliding items, etc.

A battery energy source, in place of the surface located energy surface can be mounted on pipeline scanner 1100. Also, a telemetry antenna) can be used in place of the electrical cable connecting pipeline scanner 1100 to the surface located equipment.

Pipeline scanner 1100 can have universal joints between its various segments and in the drive belts (with provision for equal speed in all portions thereof) — this allows easy navigation of curves in pipeline 1104.

In operation, shaft 1556 (driven by motor 1540) rotates (advances) rotatable measuring subassembly 1124. Coordinated with the rotation caused by shaft 1556, subassembly 1124 is rotated to the desired measurement position. A measurement of the internal diameter of pipeline 1104 is made and recorded by the above-ground recording system. Solenoid 1580 can be retracted to disengage ball bearing 1676 before moving to the next measurement position; then solenoid 1580 is deactivated and spring 1700 urges ball bearing 1676 against the internal wall of pipeline 1104.

Figure 11:
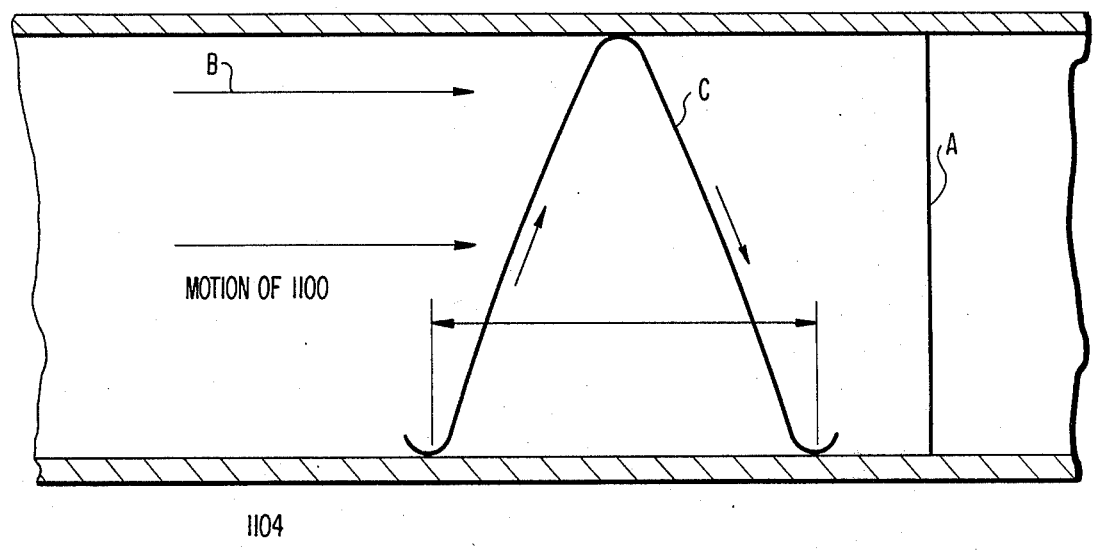
FIG. 11 is an illustration of the modes of measurement of the pipeline scanning device of this invention.

FIG. 11 illustrates three types of measurements that can be made with pipeline scanner 1100. Line A illustrates a radial measurement of the inner wall of pipeline 1104 which occurs when pipeline scanner 1100 is not moving. The radial measurements can be at 45 degree intervals, taken on an automatic basis, by means of commutator switch 1568 — see FIG. 10. Line B illustrates a longitudinal measurement of the inner wall of pipeline 1104 which occurs when there is no rotation of rotatable measuring unit 1124 and pipeline scanner 1100 is moving as a unit in pipeline 1104. Line C illustrates a helical measurement of the inner wall of pipeline 1104 which occurs when pipeline scanner 1100 is moving and rotatable measuring unit 1124 is rotating. (The period of the helical pattern is normally 6 inches to 2 feet).

The counter associated with the surface potentiometer gives a reading which can be correlated with the distance measurement producing the output value of potentiometer 1584 — the reading can be recorded on an appropriate potentiometer recording means.

The apparatus of this invention can also be used to measure the overstress in pipe piles, and the like, at any location in such pipe piles. The pertinent portions of my copending application serial no. 481,475 is incorporated herein be reference. A summary of the overstress determinations using the apparatus of this invention involves, before the pipe pile is inserted into the ground, taking a series of readings at nine points around the circumference at various depths in each pipe piling. The readings are taken at 0°, 45°, 90°, 135°, 180°, 225°, 270°, 315°, and 360°. The series of readings are taken again after the pipe pile was placed in the ground. In both cases, the nine readings are added together — by adding such readings together, it takes care of the position of the pile scanner (instrument) with respect to the center of the pipe. (The center of the instrument is slightly off of the center of the pile in most cases, but this is compensated for as shown above. For the true radius, the sum of the nine readings is divided by nine and a constant is added to the quotient.) The tests are taken at various depths for each pile and they are averaged this quotient is applied to curves to determine the degree or value of overstress in a particular piling. The curves are developed through load tests in the laboratory, that is, a pipe is loaded to a certain stress, readings are taken, etc., and curves developed. As shown in U.S. Ser. No. 481,475, the overstress point is determined for a particular measuring depth and a comparison is made with the actual measurements to see if overstress has occurred at that particular depth in the pipe pile. Applicant terms overstress as starting at the point of critical stress.

Referring to FIG. 18, of U.S. Ser. No. 481,475 (U.S. Pat. No. 3,939,570) of stress vs. strain, the point of critical stress is often termed the point of maximum obtainable stress. Line A-A represents the yield point where actual plastic deformation starts and is classically termed overstress.

The apparatus of this invention has a center axis which in practice will usually not coincide with the center axis of the pipe piling. There would be no problem (as a constant could be used to compensate) if the pipe piling did not change shape after driving. So the average of a number of measurements at different compass points at a particular level in the pipe piling must be made before and after driving — this allows a comparison of what in effect is the cross-section of the pipe piling at that level before and after driving, the difference being a measurement or indication of the overstress (or stress) present in the pipe piling at that level.

U.S. Ser. No. 481,475 discloses a specific apparatus which uses a series of rotatable solenoid stops in order to position the rotatable measuring head at 45° intervals around the arc. The specific apparatus illustrated in this application replaces the rotatable solenoid stops with a commutator switch which positions the rotatable measuring head at 45° intervals. Therefore the specific apparatus of this application can readily be used to make the necessary interval diameter measurements around the circumference of a pipe pile that are necessary to determine if overstress in the pipe pile has occurred.

What I claim is:

1. An apparatus for determining and indicating the internal diameter of, or internal wear, pitting or thinning in a hollow pipeline, normally located underground, whereby changes in the internal surface configuration or internal diameter of the pipeline at various points along its length are measured, comprising:
   a. a body member;
   b. a linear potentiometer having a shaft with a ball bearing mounted for universal movement on an end thereof, said linear potentiometer producing an output signal representative of the distance of a straight line extending from the longitudinal axis of said apparatus to the internal surface of the pipeline in a predetermined radial direction at a predetermined point along the length of the pipeline;
   c. a rotatable sensing unit in which is mounted said linear potentiometer, said sensing unit being rotatably attached to said body member;
   d. a solenoid connected to said shaft such that said solenoid urges said ball bearing against the internal wall of the pipeline when said solenoid is inactivated and retracts the ball bearing from contact with the internal wall when said solenoid is inactivated.
   e. a first motor attached to said body member and connected to said rotatable sensing unit so as to rotate said sensing unit;
   f. a second motor attached to said body member;
   g. at least two motor driven drive belts which engage the internal wall of said pipeline and are attached to said body member; and
   h. means to transmit power from said second motor to said motor driven drive belts so as to propel said body member along the hollow pipeline.

2. An apparatus as described in claim 1 wherein there are two of said motor driven drive belts, said motor driven drive belts being radially disposed at approximately 90° from each other.

3. An apparatus as described in claim 1 wherein a winch cable is attached to said body member, said winch cable being movable by a surface-located motor-driven winch.

4. An apparatus for measuring the internal diameter for indicating internal wear, pitting or thinning, if any, in a hollow pipeline, normally located underground or underwater, whereby changes in the internal surface configuration or internal diameter of the pipeline at various points along its length are measured, comprising:
   a. a sealed, elongated first casing having a circular cross-section;

b. a sealed, elongated second casing having a circular cross-section, which is attached to first casing (a) by bracket means with a space between first casing (a) and second casing (b);

c. a sealed, elongated, third casing having a circular cross-section, which is attached to second casing (b) by bracket means with a space between second casing (b) and third casing (c);

d. a sealed, elongated, fourth casing having a circular cross-section, which is attached to third casing (c) by bracket means with a space between third casing (c) and fourth casing (d);

e. first motor means mounted in second casing (b);

f. second motor means mounted in third casing (c);

g. telemetry system mounted in first casing (a);

h. rotatable shaft means extending from second motor means (f) through third casing (c) and on through fourth casing (d) to a point outside thereof;

i. rotatable sensing means attached to the end of shaft means (h), rotatable sensing means (i) being capable of sensing the distance of a line extending perpendicularly from the longitudinal axis of said apparatus to the internal surface of the pipeline in a predetermined radial direction at a predetermined point along the length of said pipeline and for producing a signal representative of said distance of said line, rotatable means (h) comprising:
  i. a linear potentiometer,
  ii. a rotatable ball bearing unit attached to the end of the shaft of linear potentiometer (i), the ball bearing thereof engaging the internal pipeline wall, and
  iii. a retraction solenoid, the shaft thereof attached to the shaft on which ball bearing unit (ii) is mounted, such solenoid (iii) serving to outwardly pressurize ball bearing (ii) against the internal wall of the pipeline when inactivated and to move ball bearing (ii) away from the internal wall of the pipeline against a biasing means when activated;

j. commutator switch means mounted on rotatable shaft means (h) in fourth casing (d) which allows receipt of the signal from linear potentiometer (i) in whatever radial position sensing means (j) is in;

k. transmission means connected to said switch means (j) and said telemetry system (g) to transmit said signal to said telemetry system (g);

l. two drive belts means that are each mounted on at least three of casings (a), (b), (c) and (d), each drive belt means including a drive belt that engages the internal wall of said pipeline, and the drive belts being driven by the motor means (e);

m. speed control and reversing means located in casing (a) which controls the speed of and reversing of motor means (e);

n. surface-located means, connected to telemetry system (g), for indicating the signal produced by potentiometer (i) which is representative of said distance of said line which is indicated by the position of ball bearing (ii) engaging the internal wall of the pile; and o. surface-located means, connected to telemetry system (g), for recording the signal produced by potentiometer (ii).

* * * * *